(12) United States Patent
Kaneko et al.

(10) Patent No.: US 6,533,311 B2
(45) Date of Patent: Mar. 18, 2003

(54) BABY CARRIAGE (75) Inventors: Ryoichi Kaneko, Tokyo-To (JP); Tokihiko Ikuno, Tokyo-To (JP); Toshiro Yoshie, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 09/893,594

(22) Filed: Jun. 29, 2001

(65) Prior Publication Data

US 2002/0000710 A1 Jan. 3, 2002

(30) Foreign Application Priority Data

Jun. 30, 2000 (JP) .......................... 2000-199140

(51) Int. Cl.7 ................................. B62B 7/06
(52) U.S. Cl. .................. 280/647; 280/642; 280/42; 280/650
(58) Field of Search ............................ 280/642, 650, 280/658, 644, 643, 657, 647, 42, 47.38, 47.36

(56) References Cited

U.S. PATENT DOCUMENTS

| | | | |
|---|---|---|---|
| 4,191,397 A | | 3/1980 | Kassai |
| 4,216,974 A | * | 8/1980 | Kassai ........................ 280/42 |
| 4,834,403 A | | 5/1989 | Yanus et al. |
| 5,181,735 A | | 1/1993 | Onishi |
| 5,447,323 A | | 9/1995 | Huang |
| 5,605,409 A | | 2/1997 | Haut et al. |
| 5,622,376 A | * | 4/1997 | Shamie ........................ 280/42 |
| 5,645,293 A | * | 7/1997 | Cheng ..................... 280/47.36 |
| 5,865,460 A | * | 2/1999 | Huang ........................ 280/642 |
| 5,979,928 A | | 11/1999 | Kuo |
| 6,062,587 A | * | 5/2000 | Cabeagnero ............. 280/47.38 |
| 6,139,046 A | * | 10/2000 | Aalund et al. ........... 280/47.38 |
| 6,152,477 A | * | 11/2000 | Hsin et al. ................... 280/642 |
| 6,267,405 B1 | * | 7/2001 | Chen .......................... 280/647 |
| 6,273,451 B1 | * | 8/2001 | Julien et al. ............. 280/47.33 |

FOREIGN PATENT DOCUMENTS

EP    0 494 736 A2    7/1992

* cited by examiner

Primary Examiner—Brian L. Johnson
Assistant Examiner—Hau Phan
(74) Attorney, Agent, or Firm—Birch, Stewart Kolasch & Birch, LLP (57) ABSTRACT

A baby carriage includes a pair of front legs 12, 12 each having a front wheel 11 at its lower end of the leg 12, a pair of rear legs 14, 14 each having a rear wheel 13 at its lower end of the leg 14, a pair of side connecting rods 23, 23 each having one end rotatably connected to a middle part of the front leg 12 and the other end rotatably connected to a middle part of the rear leg 14, a pair of handle pipes 18, 18 having their middle parts rotatably connected to upper parts of the rear legs 14, 14 respectively and a pair of locking mechanisms 25, 25 connecting respective lower ends of the handle pipes 18, 18 with upper ends of the front legs 12, 12 respectively. Each of the locking mechanisms 25, 25 is adapted so as to be in a fixing state where the handle pipe 18 is fixed with respect to the front leg 12 substantially along an extending direction of the front leg 12 and also in a folding state where the handle pipe 18 is folded close to the front leg 12, allowing a number of constituents and a height of the baby carriage to be reduced together.

10 Claims, 8 Drawing Sheets

BABY CARRIAGE

BACKGROUND OF THE INVENTION

1. Technical Field of the Invention

The present invention relates to a foldable baby carriage.

2. Description of the Related Art

Various foldable baby carriages for carrying a baby when taking the baby outdoors for walking or shopping have been proposed. When necessary, the foldable baby carriage are folded for easy storage and carrying.

Figure 8:
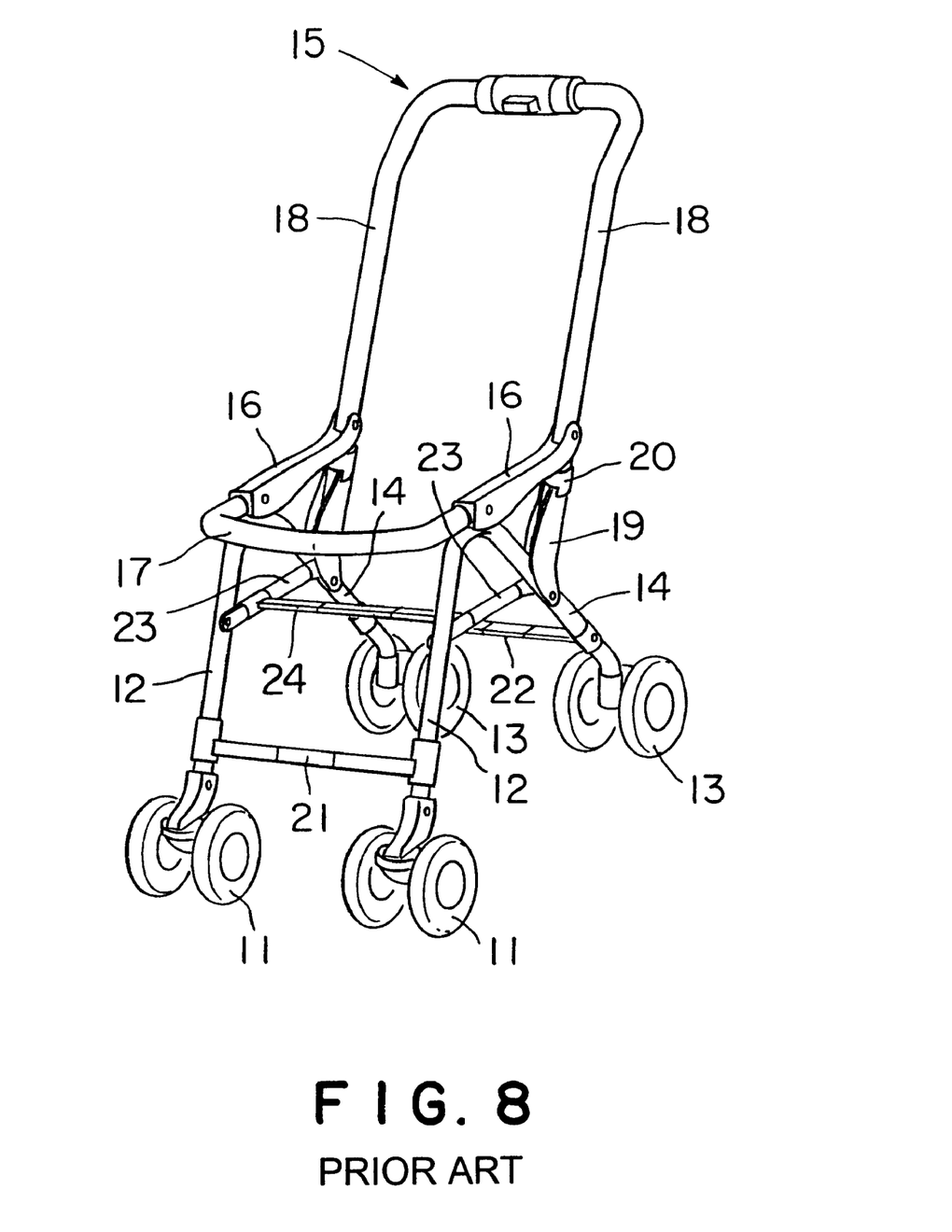
FIG. 8 is a perspective view of the conventional baby carriage.

FIG. 8 shows the foldable baby carriage in a perspective view. The baby carriage includes right and left front legs 12 each provided with a front wheel 11, right and left rear legs 14 each provided with a rear wheel 13, a substantially U-shaped handle 15, right and left armrests 16, and a guard arm 17 detachably connected to and extended between the armrests 16. Rear ends of the armrests 16 are pivotally joined to parts of right and left pipes 18 forming the handle 15 near the lower ends of the pipes 18. The upper ends of the rear legs 14 are pivotally joined to the middle parts of the armrests 16. Lower ends of generally L-shaped brackets 19 are pivotally joined to middle parts of the rear legs 14. The lower ends of the right and left pipes 18 are pivotally joined to middle parts of the brackets 19. When the baby carriage is developed, locking members 20 slidably mounted on lower end parts of the pipes 18 engage with locking parts formed in upper end parts of the brackets 19 to lock the baby carriage in an expanded state.

The right and left front legs 12 are connected by a front connecting rod 21, and the right and left rear legs 14 are connected by a rear connecting rod 22. A side connecting rod 23 has a front end pivotally joined to a middle part of each front leg 12, and a rear end pivotally joined together with the bracket 19 to the lower end of the pipes 18. Middle part of the right and left connecting rods 23 are connected by an upper connecting rod 24.

As shown in FIG. 8, the baby carriage is locked in the developed state for use by bringing the locking members 20 mounted on the lower ends of the pipes 18 into engagement with locking parts formed in the upper end parts of the brackets 19. When the locking members 20 are disengaged from the brackets 19 by operating an operating system arranged on the handle 15, the armrests 16 and the side connecting rods 23 can be turned upward about pivotal joining points where the armrests 16 and the side connecting rods 23 are pivotally joined to the vertical sections so that the front legs 12 and the rear legs 14 become substantially parallel to each other, whereby the baby carriage is folded in a package easy to carry.

Figure 9:
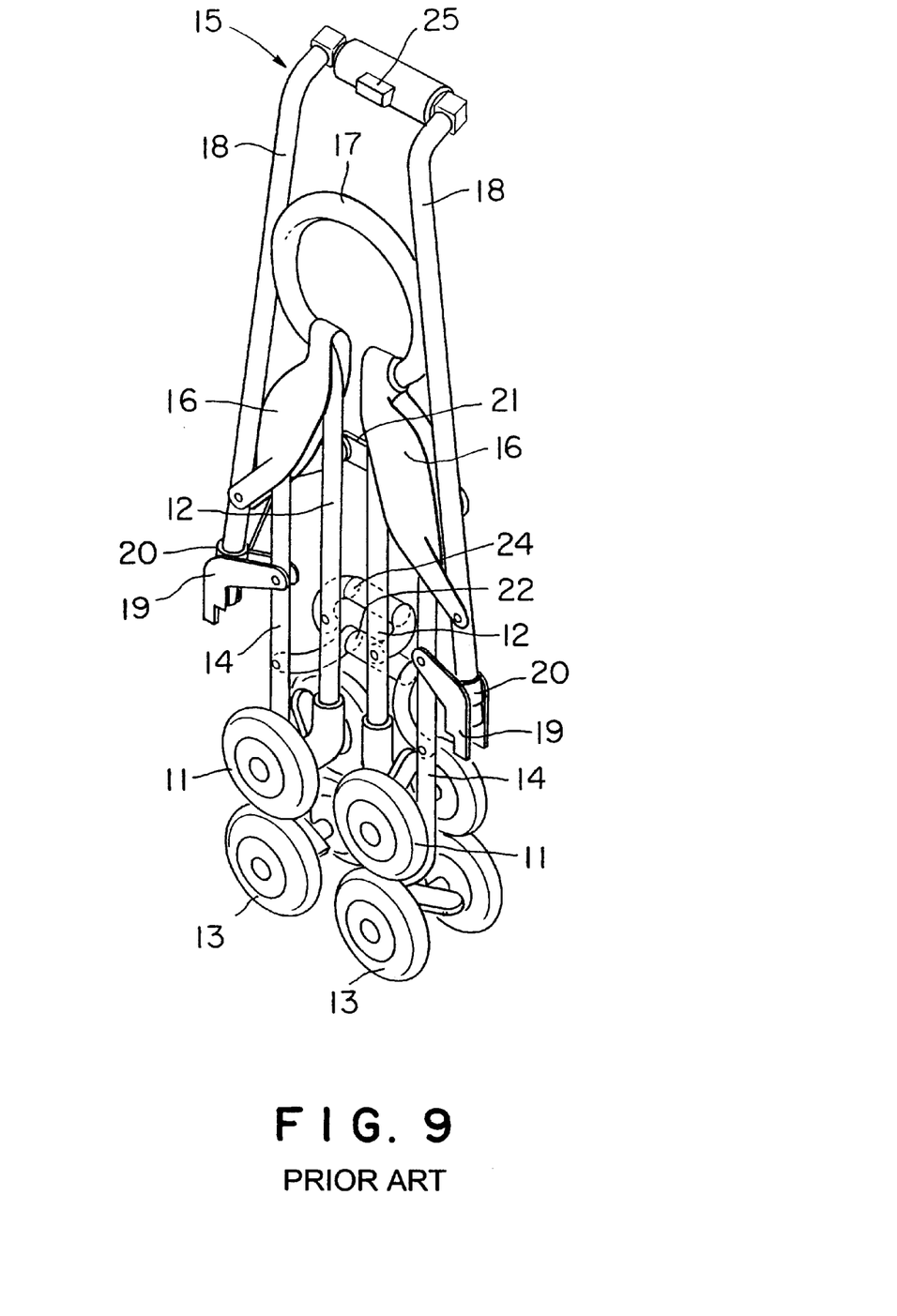
FIG. 9 is a view showing the baby carriage of FIG. 8 folded in three.

The handle 15, the front connecting rod 21, the rear connecting rod 22, and the upper connecting rod 24 are provided in their middle parts with right and left joints and are foldable. The right joints of the handle 15, the front connecting rod 21, the rear connecting rod 22, and the upper connecting rod 24 are in a right vertical plane, and the left joints of the same are in a left vertical plane. When the left and right pipes 18 are moved forward after folding the front legs 12 and the rear legs 14 in parallel to each other, opposite end portions of the handle 15, the same portions of the front connecting rod 21, the same portions of the rear connecting rod 22 and the same portions of the upper connecting rod 24 are turned forward and the baby carriage can be folded in a compact package as shown in FIG. 9; that is, the baby carriage can be folded in three.

Although the front legs 12 and the rear legs 14 are somewhat raised with respect to the handle 15 by the upward swing of the armrests 16 at the folding operation of the baby carriage, the height of the folded baby carriage is not reduced so much. Furthermore, the above-mentioned folding structure requires the large armrests having the front legs and the rear legs pivotally connected thereto and the brackets for connecting the rear legs to the handle pipes pivotally, causing the number of components to be increased costly.

SUMMARY OF THE INVENTION

Under the above-mentioned situation, the object of the present invention is to provide a baby carriage which allows a number of components thereof and its height to be together reduced in comparison with those of the conventional baby carriage mentioned above.

The first feature of the present invention resides in the provision of a baby carriage comprising a pair of front legs each provided, at a lower end thereof, with a front wheel; a pair of rear legs each provided, at a lower end thereof, with a rear wheel; a pair of side connecting rods each having one end thereof rotatably connected to a middle part of the front leg and the other end rotatably connected to a middle part of the rear leg; a pair of handle bars having respective middle parts thereof rotatably connected to upper parts of the rear legs respectively; and a pair of locking mechanisms connecting lower ends of the handle bars with upper ends of the front legs respectively; wherein each of the locking mechanisms is adapted so as to be in a fixing state where the handle bar is fixed with respect to the front leg substantially along an extending direction thereof and also in a folding state where the handle bar is folded close to the front leg.

According to the second feature of the invention, the front legs, the rear legs, the side connecting rods and the handle bars are juxtaposed with each other in the folding state of the locking mechanisms.

According to the third feature of the invention, each of the locking mechanisms includes an engagement recess provided in either one of the front leg and the handle bar and an engagement projection provided in the other of the front leg and the handle bar, for engaging with the engagement recess.

According to the fourth feature of the invention, the engagement recess is provided in the front leg, while the engagement projection is provided in the handle bar.

According to the fifth feature of the invention, each of the locking mechanisms further includes an urging unit for urging the engagement projection toward the engagement recess.

According to the sixth feature of the invention, each of the locking mechanisms further includes an unlocking member which is associated with the engagement projection and which is operable from its outside to allow the engagement projection to be separated from the engagement recess against an urging force of the urging unit thereby releasing the locked engagement projection.

According to the seventh feature of the invention, the unlocking member is arranged on the handle bar, between a connecting part of the handle bar with the front leg and another connecting part of the handle bar with the rear leg.

According to the eighth feature of the invention, each of the locking mechanisms is provided with a bracket used as an armrest.

According to the ninth feature of the invention, the baby carriage further comprises a front-leg connecting rod arranged between the pair of front legs; a rear-leg connecting rod arranged between the pair of rear legs; an upper connecting rod arranged between the pair of side connecting rods; and a handle part arranged between the pair of handle bars.

According to the tenth feature of the invention, the front-leg connecting rod, the rear-leg connecting rod, the upper connecting rod and the handle part are respectively adapted so as to be in a substantially identical plane in the folding state.

According to the eleventh feature of the invention, the front-leg connecting rod, the rear-leg connecting rod, the upper connecting rod and the handle part, each have respective two hinges formed in two places on left and right sides thereof. The hinges of the front-leg connecting rod are rotatable about a rotating axis substantially parallel to with the front legs. The hinges of the rear-leg connecting rod are also rotatable about a rotating axis substantially parallel to with the rear legs. The hinges of the upper connecting rod are rotatable about a rotating axis substantially parallel to the side connecting rods. The hinges of the handle part are also rotatable about a rotating axis substantially parallel to the handle bars. With this structures of these hinges, the front leg, the rear leg, the side connecting rod and the handle bar on the left side and the other front leg, the other rear leg, the other side connecting rod and the other handle bar on the right side can be further folded forward, subsequently to the folding state.

The above and other features and advantages of this invention will become apparent and the invention itself will best be understood, from a study of the following description and appended claims, with reference to the attached drawings showing one preferred embodiment of the invention.

DESCRIPTION OF THE PREFERRED EMBODIMENT

Figure 1:
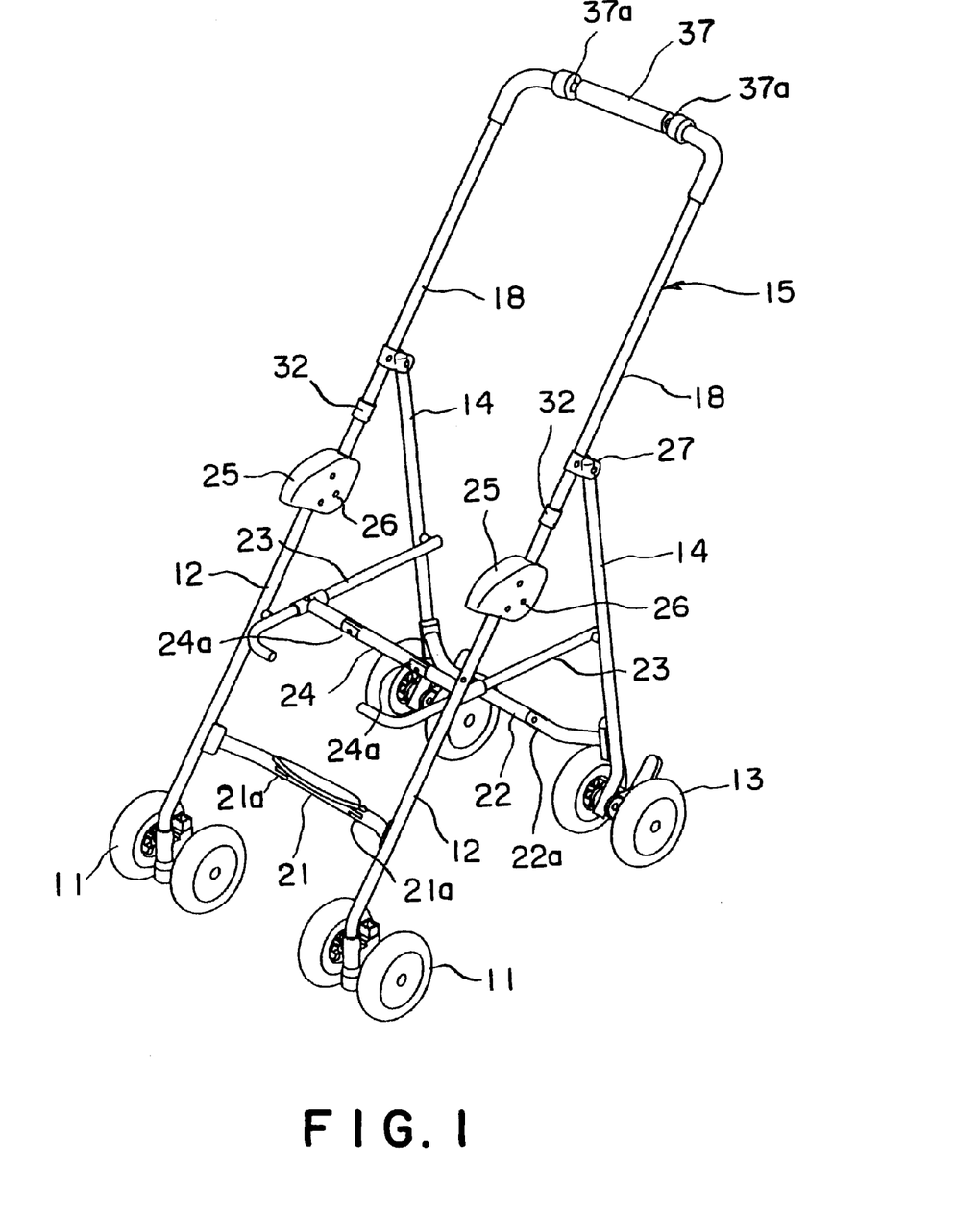
FIG. 1 is a perspective view showing the structure of a baby carriage in accordance with an embodiment of the present invention.

With reference to FIGS. 1 to 7, one embodiment of the present invention will be described below. FIG. 1 is a perspective view showing the structure of a baby carriage of the invention. Left and right front legs 12 in pairs, are provided with front wheels 11. The front legs 12 have their top ends secured to brackets 25 also serving as armrests, respectively. A substantially U-shaped handle 15 has left and right handle pipes (or bars) 18 whose ends are pivotally connected to the brackets 25 through horizontal shafts 26, respectively. The other ends of the handle pipes 18 are connected with each other through a handle part 37. Pivotally connected with the left and right handle pipes 18 are rear legs 14 which include rear wheels 13 respectively. Through the intermediary of couplings 27, the upper ends of the rear legs 14 are connected to the pipes 18 so as to pivot about the horizontal axis.

Figure 2:
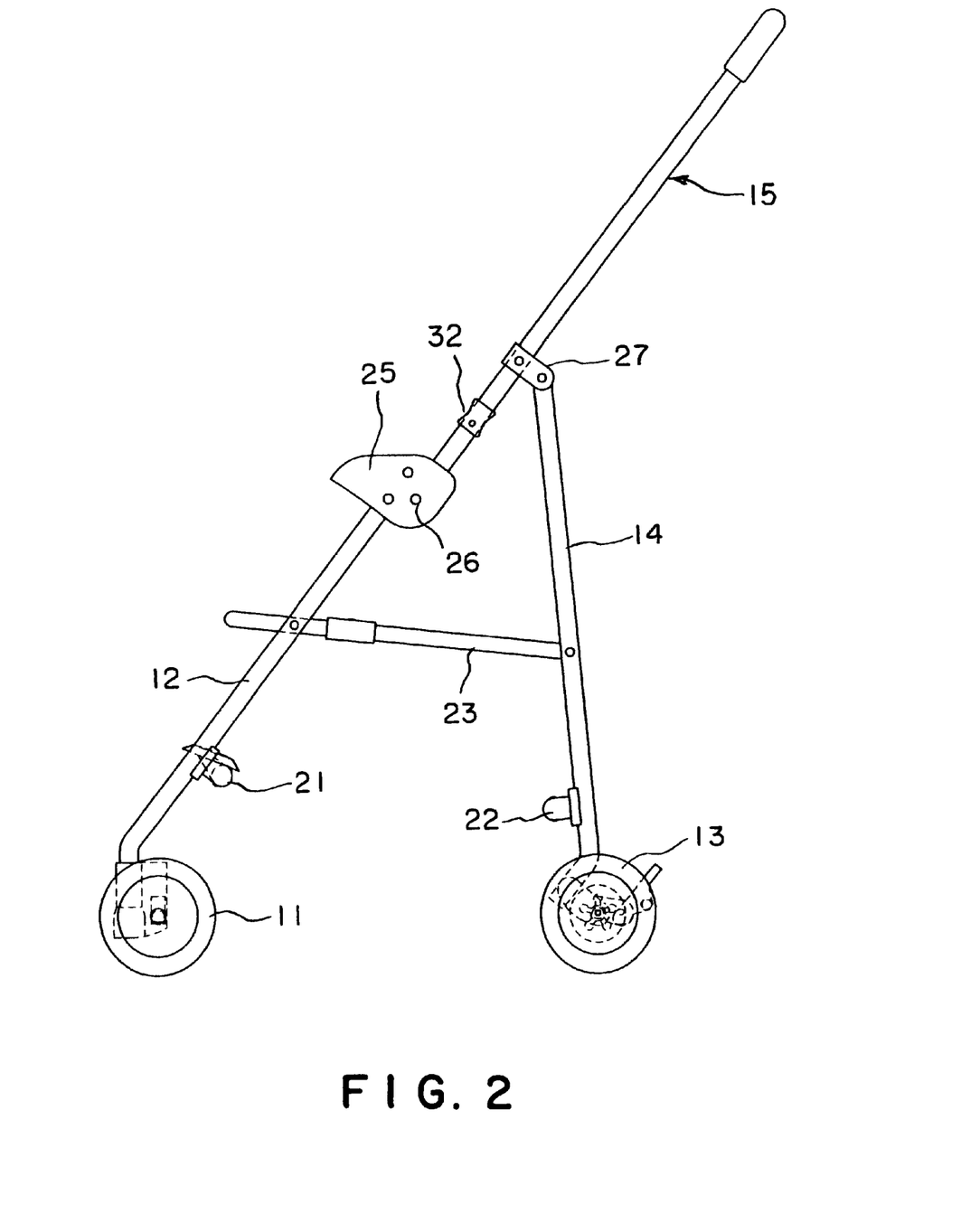
FIG. 2 is a side view of the baby carriage of FIG. 1.

The front legs 12 in right and left are connected with each other through a front connecting rod (or front-leg connecting rod) 21. Similarly, the rear legs 14 in right and left are mutually connected through a rear connecting rod (or rear-leg connecting rod) 22. Extending in the forward-and-rearward direction of the baby carriage are side connecting rod 23 each of which has a front part pivotally connected to a middle part of each front leg 12 and a rear end pivotally connected to a middle part of each rear leg 14. The respective leading ends of the side connecting rods 23 are bent mutually inward. The middle parts of the left and right side connecting rods 23 are connected to each other through an upper connecting rod 24. FIG. 2 shows a side view of the so-assembled baby carriage.

Figure 3:
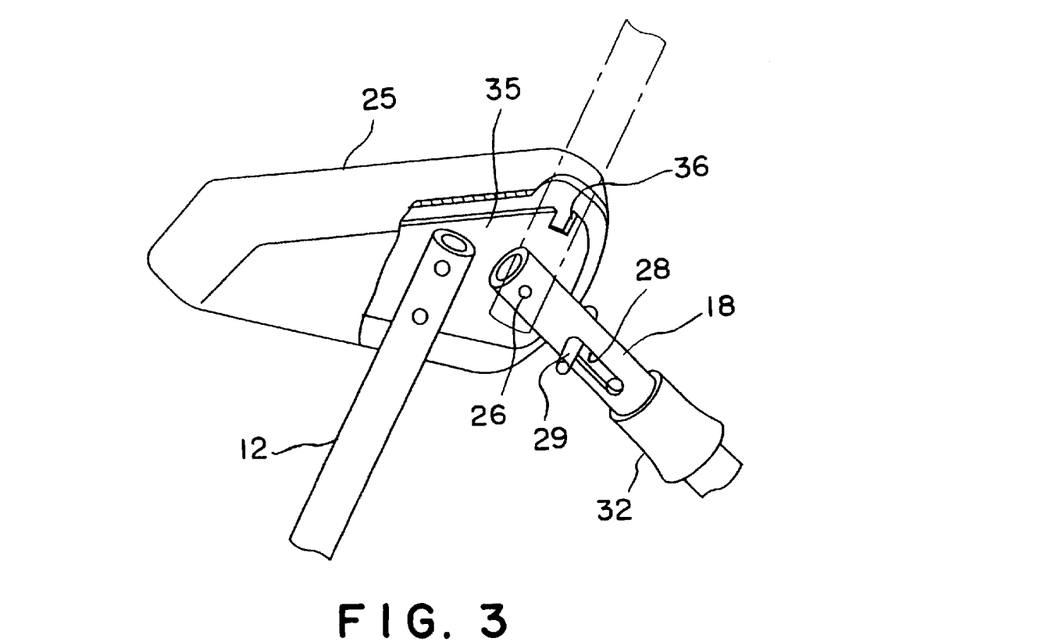
FIG. 3 is a partially cutaway perspective view showing a locking-and-unlocking mechanism between a front leg and a handle frame.
Figure 4:
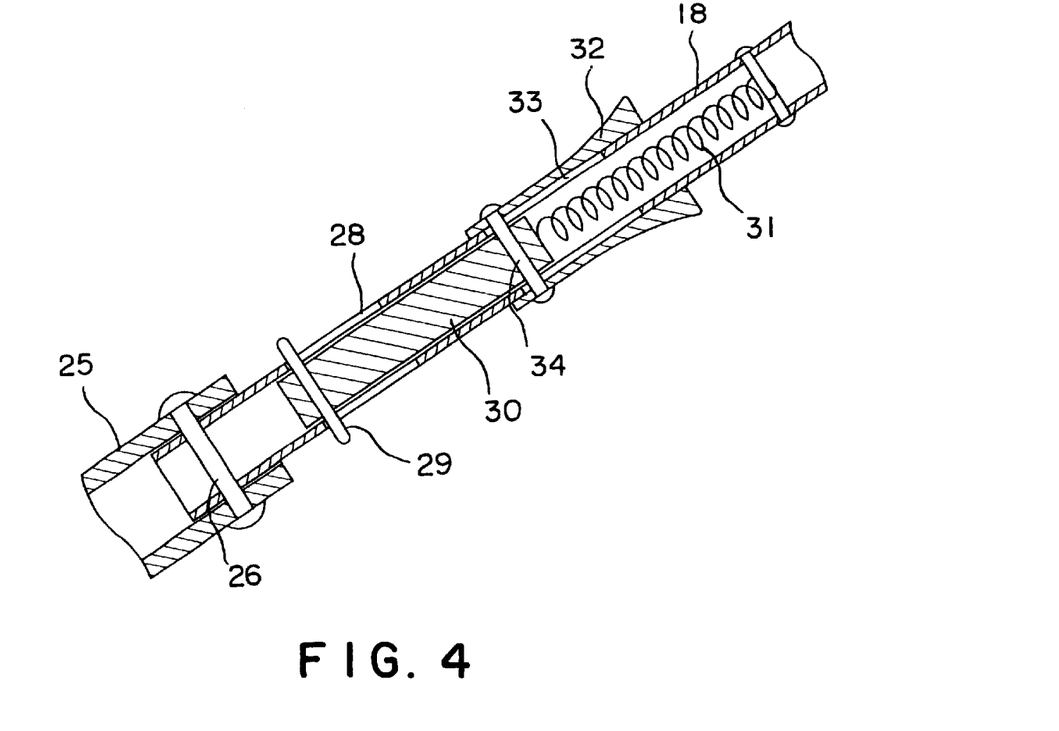
FIG. 4 is a sectional view of showing the leading end of a handle pipe.

FIG. 3 is a partially cutaway perspective view of the bracket 25. The top end of the front leg 12 is secured to the bracket 25. While, the end of the handle pipe 18 of the handle 15 is pivoted to the bracket 25 through the horizontal shaft 26. The handle pipe 18 is provided, on both sides of the vicinity of the leading end, with long holes 28 extending along the axial direction of the pipe 18. An engagement pin 29 for locking penetrates the long holes 28 while projecting both ends of the pin 29 from both sides of the pipe 18 outward. As shown in FIG. 4, the engagement pin 29 is secured to a pin carrier 30 slidably arranged in the handle pipe 18. The pin carrier 30 is urged toward the leading end of the handle pipe 18 by a spring 30 therein, so that the engagement pin 29 is also urged to the ends of the long holes 28 through the pin carrier 30.

A unlocking knob (unlocking member) 32 is fitted to the handle pipe 18 and further connected with the pin carrier 30 through a pin 34 which is inserted into long holes 33.

A lock plate 35 is secured to the bracket 25. The lock plate 35 is provided, on its upper periphery, with a locking recess 36 which engages with the engagement pin 29 when the handle 15 is in the developed state, that is, the baby carriage is in its usable state.

Accordingly, when the baby carriage is used as shown in FIGS. 1 and 2, the handle pipes 18 of the handle 15 are extended upward as shown with an alternate long and short dash line of FIG. 3. Then, the engagement pin 29 is engaged with the locking recess 36 to maintain the handle 15 in the developed state.

Figure 5:
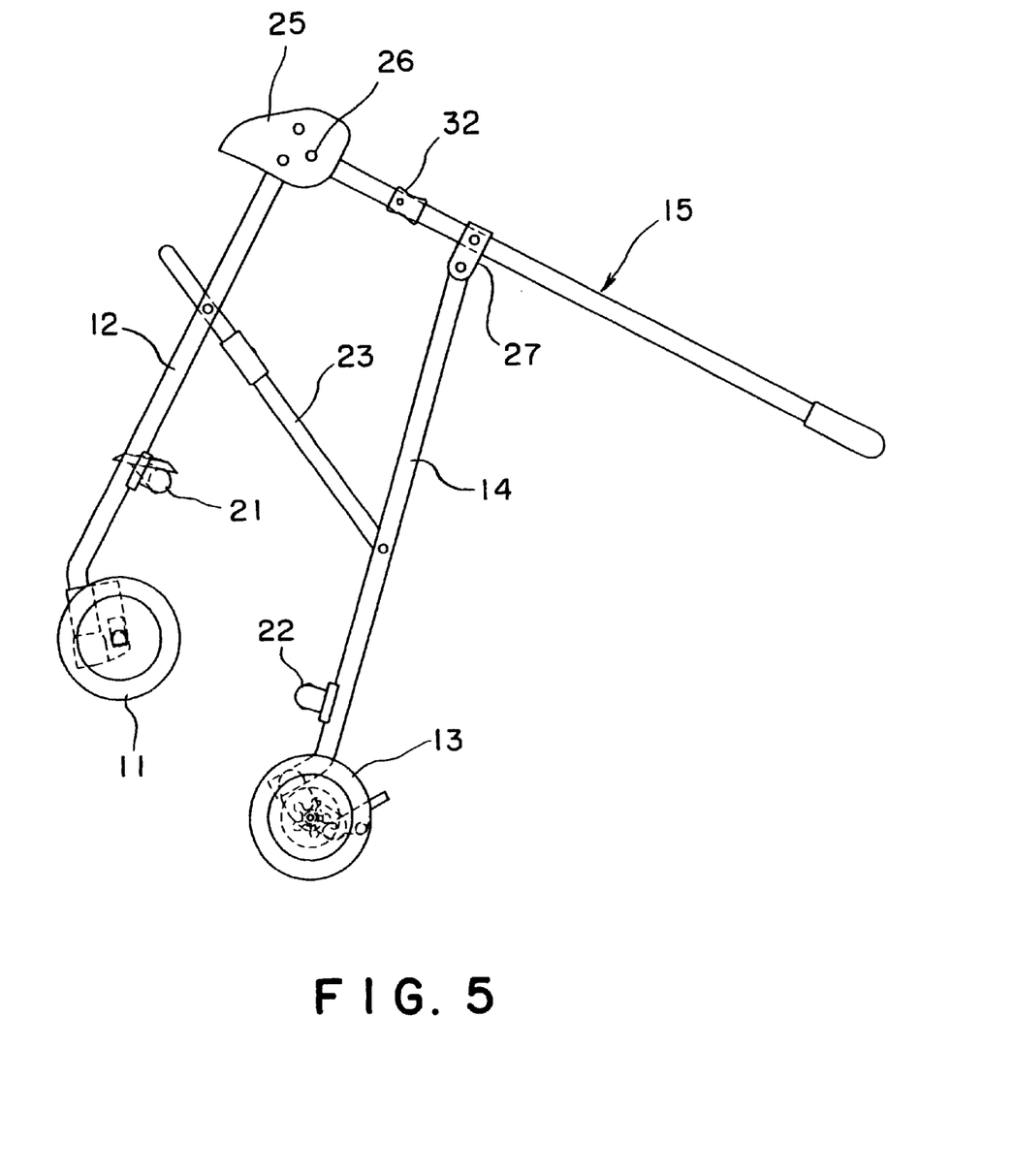
FIG. 5 is a view showing the baby carriage of FIG. 1 while it is being folded.

Meanwhile, when folding the baby carriage, hold the leading ends of the left and right handle pipes 18 of the handle 15 and pull up the unlocking knobs 32 toward a manipulator. Consequently, the pin carrier 30 is moved upward against the force of the spring 31, so that the engagement pin 29 is detached from the locking recess 36 to release the handle 15 in the locked state. When the handle 15 is rotated about the horizontal shaft 26 so that the leading ends of the handle pipes 18 of the handle 15 are raised while lowering the handle part 37, the rear legs 14 are relatively rotated about the horizontal axes of the couplings 27 in a direction for the handle 15, as shown in FIG. 5. Correspondingly, the side connecting rods 23 are also rotated about their pivots with the rear legs 14 in a clockwise direction of FIG. 5. Then, the front legs 12 are also rotated about the horizontal shafts 26 in the counter clockwise direction, so that the front legs 12, the rear legs 14 and the handle 15 are folded so as to be generally parallel with each other, as shown in FIG. 6.

Figure 6:
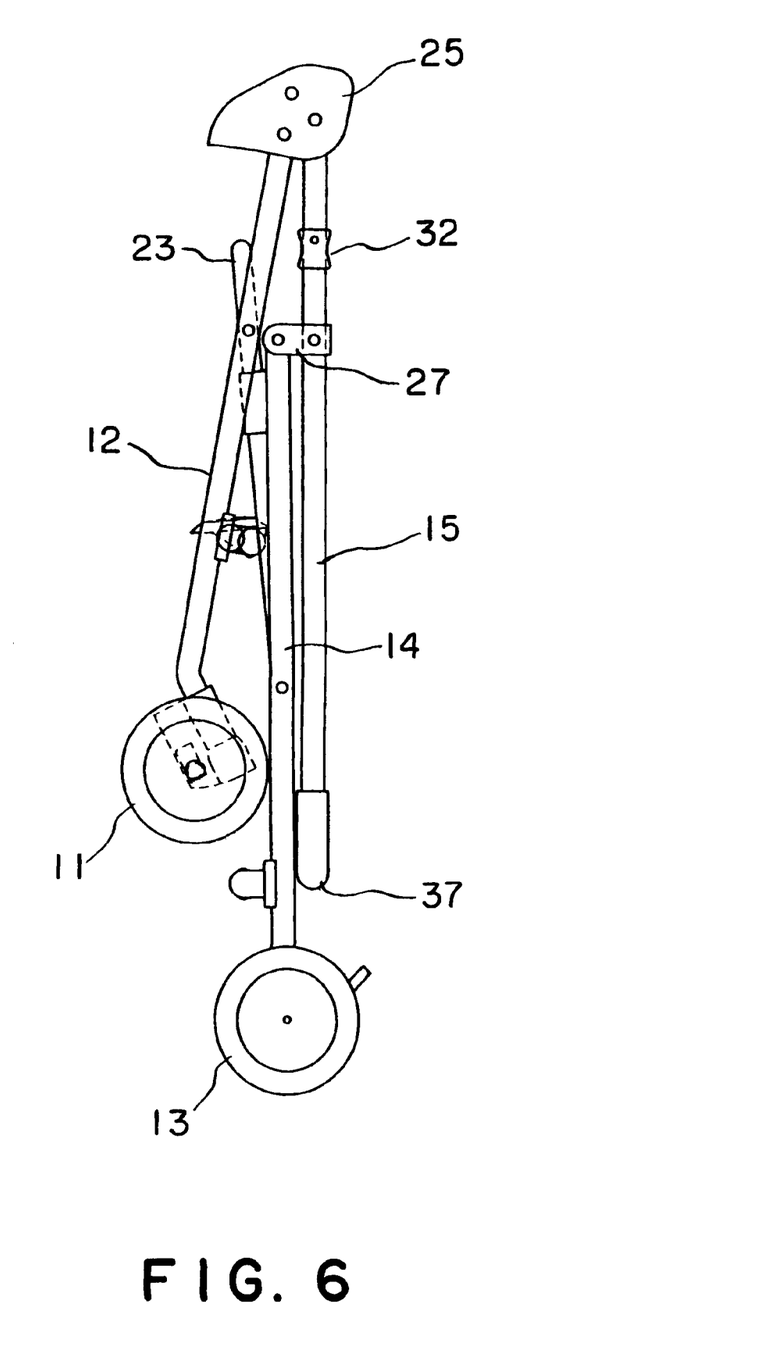
FIG. 6 is a side view showing the baby carriage which is folded into its plane form.

Note, with the establishment of the side connecting rods 23 with respect to their pivots and lengths, the handle part 37, the rear connecting rod 22, the upper connecting rod 24 and the front connecting rod 21 are positioned in the substantially identical plane when folding the baby carriage as shown in FIG. 6. Further, the handle part 37, the rear connecting rod 22, the upper connecting rod 24 and the front connecting rod 21 are provided with two hinges 37a, 37a; 22a, 22a; 24a, 24a; 21a, 21a, respectively. These hinges 37a, 22a, 24a, 21a in two pairs are respectively positioned in two vertical planes crossing two intermediate portions of the above elements 37, 22, 24, 21 commonly (see FIG. 1). The respective hinges 37a, 22a, 24a, 21a are constructed so as to be rotatable about axes perpendicular to respective longitudinal axes of the elements 37, 22, 24, 21 when the front legs 12, the rear legs 14 and the handle 15 are folded.

Figure 7:
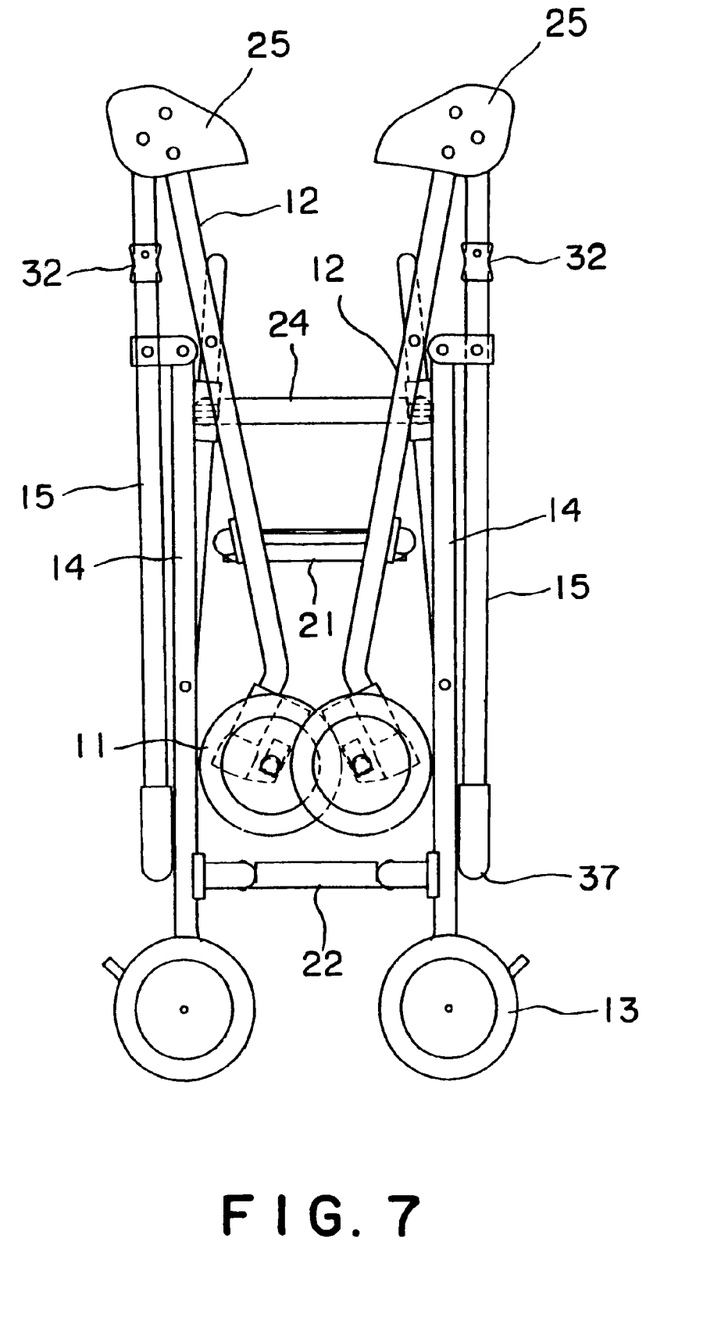
FIG. 7 is a front view showing the baby carriage of FIG. 6 further folded in three.

Thus, when an external force is applied on the baby carriage in a direction to allow the handle pipes 18 of the handle 15 to approach each other after the baby carriage has been folded as shown in FIG. 6, all of the handle part 37, the rear connecting rod 22, the upper connecting rod 24 and the front connecting rod 21 are folded forward through the hinges, accomplishing to fold the baby carriage in three while reducing its breadth, as shown in FIG. 7.

As mentioned above, the baby carriage of the invention includes the pair of front legs 12, 12 each having a front wheel 11 at its lower end of the leg 12, a pair of rear legs 14, 14 each having the rear wheel 13 at the lower end of the leg 14, the pair of cross connecting rods 23, 23 each having one end rotatably connected to the middle part of the front leg 12 and the other end rotatably connected to the middle part of the rear leg 14, the pair of handle pipes 18, 18 having their middle parts rotatably connected to the upper parts of the rear legs 14, 14 respectively and the pair of locking mechanisms 25, 25 connecting the lower ends of the handle pipes 18, 18 with the upper ends of the front legs 12, 12 respectively. Further, each of the locking mechanisms 25, 25 is adapted so as to be in the fixing state where the handle pipe 18 is fixed with respect to the front leg 12 substantially along the extending direction of the front leg 12 and also in the folding state where the handle pipe 18 is folded close to the front leg 12. Therefore, it is possible to lower the height of the folded baby carriage remarkably. Additionally, since there is no need to provide the conventional large armrests and brackets for connecting the handle to the rear legs, a number of components can be reduced to provide the lightweight baby carriage and additionally, the manufacturing cost and the number of manufacturing steps can be reduced. Further, since the handle 15 is connected with the rear legs 14 through the intermediary of no rotatable bracket, it is also possible to prevent the occurrence of rattle. Owing to the provision of the unlocking knobs (unlocking members) 32 each arranged between the pivot part of the handle 15 with the rear leg 14 and the locking mechanism, it is possible for an user to perform the folding operation simultaneously with the unlocking operation, accomplishing to fold the baby carriage with remarkable ease. Further, since the front connecting rod 21, the rear connecting rod 22, the upper connecting rod 24 and the handle part 37 of the handle are all positioned in the identical plane when folding the baby carriage, and all provided with the hinges in predetermined positions, the baby carriage can be folded in three remarkably small.

What is claimed is:

1. A baby carriage comprising:
   a pair of front legs, each provided with a front wheel, at a lower end thereof;
   a pair of rear legs, each provided with a rear wheel, at a lower end thereof;
   a pair of side connecting rods each having one end thereof rotatably connected to a middle part of the front leg and the other end rotatably connected to a middle part of the rear leg;
   a pair of handle bars having respective middle parts thereof rotatably connected to upper parts of the rear legs respectively;
   a pair of locking mechanisms connecting lower ends of the handle bars with upper ends of the front legs respectively;
   a front-leg connecting rod having three parts joined by two hinges arranged between the pair of front legs;
   a rear-leg connecting rod having three parts joined by two hinges arranged between the pair of rear legs;
   an upper connecting rod having three parts joined by two hinges arranged between the pair of side connecting rods; and
   a handle part having three parts joined by two hinged arranged between the pair of handle bars,
   wherein each of the locking mechanisms is adapted so as to be in a fixing state where the handle bar is fixed with respect to the front leg substantially along an extending direction thereof and also in a folding state where the handle bar is folded close to the rear leg.

2. A baby carriage as claimed in claim 1, wherein the front legs, the rear legs, the side connecting rods and the handle bars are juxtaposed with each other in the folding state of the locking mechanisms.

3. A baby carriage as claimed in claim 2, wherein each of the locking mechanisms includes:
   an engagement recess provided in either one of the front leg and the handle bar; and
   an engagement projection provided in the other of the front leg and the handle bar, for engaging with the engagement recess.

4. A baby carriage as claimed in claim 3, wherein the engagement recess is provided in the front leg, while the engagement projection is provided in the handle bar.

5. A baby carriage as claimed in claim 4, wherein each of the locking mechanisms further includes an urging unit for urging the engagement projection toward the engagement recess.

6. A baby carriage as claimed in claim 5, wherein each of the locking mechanisms further includes an unlocking member which is associated with the engagement projection and which is operable from outside to allow the engagement projection to be separated from the engagement recess against an urging force of the urging unit thereby releasing the locked engagement projection.

7. A baby carriage as claimed in claim 6, wherein the unlocking member is arranged on the handle bar, between a connecting part of the handle bar with the front leg and another connecting part of the handle bar with the rear leg.

8. A baby carriage as claimed in claim 1, wherein each of the locking mechanisms is provided with a bracket used as an armrest.

9. A baby carriage as claimed in claim 1, wherein the front-leg connecting rod, the rear-leg connecting rod, the upper connecting rod and the handle part are respectively adapted so as to be in a substantially identical plane in the folding state.

10. A baby carriage as claimed in claim 9, wherein the front-leg connecting rod, the rear-leg connecting rod, the upper connecting rod and the handle part, each have two hinges formed in two places on left and right sides thereof, the hinges of the front-leg connecting rod being rotatable about a rotating axis substantially parallel to with the front legs, the hinges of the rear-leg connecting rod being rotatable about a rotating axis substantially parallel to with the rear legs, the hinges of the upper connecting rod being rotatable about a rotating axis substantially parallel to the side connecting rods, the hinges of the handle part being rotatable about a rotating axis substantially parallel to the handle bars, whereby the front leg, the rear leg, the side connecting rod and the handle bar on the left side and the other front leg, the other rear leg, the other side connecting rod and the other handle bar on the right side can be further folded forward, subsequently to the folding state.

\* \* \* \* \*